(12) United States Patent
Canpolat et al.

(10) Patent No.: US 9,398,526 B2
(45) Date of Patent: Jul. 19, 2016

(54) TECHNIQUES FOR ESTABLISHING COMMUNICATIONS WITH A LOCAL WIRELESS NETWORK

(71) Applicant: Intel Corporation, Santa Clara, CA (US)

(72) Inventors: Necati Canpolat, Beaverton, OR (US); Vivek Gupta, Milpitas, CA (US)

(73) Assignee: INTEL CORPORATION, Santa Clara, CA (US)

(*) Notice: Subject to any disclaimer, the term of this patent is extended or adjusted under 35 U.S.C. 154(b) by 214 days.

(21) Appl. No.: 13/867,099

(22) Filed: Apr. 21, 2013

(65) Prior Publication Data
US 2014/0199968 A1    Jul. 17, 2014

Related U.S. Application Data

(60) Provisional application No. 61/751,755, filed on Jan. 11, 2013.

(51) Int. Cl.
  *H04M 3/16*    (2006.01)
  *H04W 48/20*   (2009.01)
  *H04W 52/02*   (2009.01)
  *H04W 48/16*   (2009.01)

(52) U.S. Cl.
  CPC .......... *H04W 48/20* (2013.01); *H04W 52/0216* (2013.01); *H04W 52/0229* (2013.01); *H04W 48/16* (2013.01)

(58) Field of Classification Search
  CPC ...... H04W 84/12; H04W 48/18; H04W 12/08
  USPC .................................. 455/410, 411
  See application file for complete search history.

(56) References Cited

U.S. PATENT DOCUMENTS

| | | | |
|---|---|---|---|
| 7,443,824 B1* | 10/2008 | Lipford et al. | 370/338 |
| 2007/0242645 A1 | 10/2007 | Stephenson et al. | |
| 2012/0076117 A1 | 3/2012 | Montemurro et al. | |
| 2012/0281609 A1* | 11/2012 | Kasslin et al. | 370/312 |
| 2013/0007853 A1 | 1/2013 | Gupta et al. | |
| 2014/0018037 A1* | 1/2014 | Shanmugavadivel et al. | 455/411 |
| 2014/0023059 A1* | 1/2014 | Gupta | 370/338 |
| 2014/0092805 A1* | 4/2014 | van de Ven et al. | 370/328 |
| 2014/0185597 A1 | 7/2014 | Gupta et al. | |
| 2014/0199968 A1 | 7/2014 | Canpolat et al. | |
| 2014/0233406 A1 | 8/2014 | Chhabra et al. | |
| 2015/0078359 A1 | 3/2015 | Scahill et al. | |

OTHER PUBLICATIONS

Wi-Fi Alliance® Technical Committee Hotspot 2.0 Technical Task Group Hotspot 2.0 (Release 2) Technical Specification, Version 2.04, dated Jan. 2, 2013 ("Hotspot 2.0"), 146 pages (author unknown).

(Continued)

*Primary Examiner* — Khalid Shaheed

(57) ABSTRACT

An apparatus includes a memory to store one or more identifiers for respective one or more home service providers, circuitry coupled to the memory, and a network access component for execution on the circuitry to automatically identify a set of access points that can provide wireless service to a device based upon the one or more identifiers, and select an access point from the identified set of access points to establish a wireless connection. Other embodiments are disclosed and claimed.

23 Claims, 7 Drawing Sheets

NAI Realm #AA

NAI Home Realm #2

702

ANQP Server 404

(56) References Cited

OTHER PUBLICATIONS

"Draft Standard for Information Technology—Telecommunications and information exchange between systems—Local and metropolitan area networks—Specific requirements Part 11: Wireless LAN Medium Access Control (MAC) and Physical Layer (PHY) specifications", IEEE P802.11u/D13.0, Nov. 2010, 218 pages (author unknown).

Office Action received for U.S. Appl. No. 14/129,943, mailed Aug. 31, 2015, 16 pages.

* cited by examiner

TECHNIQUES FOR ESTABLISHING COMMUNICATIONS WITH A LOCAL WIRELESS NETWORK

This application claims priority to U.S. provisional patent application No. 61/751,755 filed Jan. 11, 2013, and incorporated by reference herein in its entirety.

BACKGROUND

Communications infrastructure for wireless local area networks (WLAN), such as those operating under the Institute of Electrical and Electronics Engineers (IEEE) 802.11 series of standards (collectively referred to as "Wi-Fi"), continues to evolve to meet changing user needs. In general, an association process for a user to find and connect to a correct Wi-Fi network may require excessive time and complications for most users. Further, Wi-Fi networks do not provide a convenient mechanism to assume work requests from overloaded wireless wide area networks (WWAN), such as overloaded 3G and 4G cellular radiotelephone networks. Recent efforts to address some of these issues have led to development of a series of standards to simplify connection and roaming in Wi-Fi based networks. These standards are sometimes collectively referred to informally as "Hotspot" standards. In particular, a Hotspot 2.0 standard represents evolution of Wi-Fi infrastructure supported by the Wi-Fi Alliance® and is designed to interoperate with the IEEE 802.11 standards for WLAN communications. Some goals of the Hotspot 2.0 standards include enabling simple, secure connection to Wi-Fi hotspots, facilitating easy roaming among them, and managing traffic offload from 3G/4G networks to Hotspot 2.0-enabled Wi-Fi networks. As part of this effort, network operators are presently deploying a large number of Wi-Fi hotspots to address the growing data demand, provide better quality of experience, and reduce churn.

However, one of the fundamental remaining challenges facing users of Wi-Fi capable devices in public hotspots is the ability to discover which Wi-Fi hotspot is available for users/devices to access based upon the credentials possessed by a given user. In the absence of any standards, this process involves a multiple step trial and error method. Among the various actions that may be performed before a user successfully accesses a given public hot-spot, the user of a wireless device may be required to find and launch a "Connection Manager" program or application resident on the wireless device. Subsequently, the wireless device may scan for publicly available wireless networks, which may be displayed on the wireless device to the user as a service set identifier (SSID). A SSID typically represents a public name for a given network. The user may then manually select a SSID to connect to a corresponding wireless network hotspot. The wireless device may then perform an association process with the selected hotspot (wireless access point of the wireless network). Subsequently, in typical scenarios, the user may manually launch a web browser application, which triggers the hotspot to launch a web page on the user's wireless device that redirects the session and displays provider information and/or roaming partner information. At this point, a determination is typically made as to whether the wireless device user has the proper credentials to access the provider of the hotspot or whether network roaming is supported. If so, access to the public hotspot may be permitted following one or more additional actions, such as the user providing specific information indicating credentials, such as providing codes, selecting menu items provided in the web browser, and so forth.

As is apparent, the above process is both extensive and may entail needless complication and time. Although this process to obtain Wi-Fi hotspot access may be familiar to many users, the extensive procedures required and the potential for making errors during such procedures may cause excessive user frustration and generally deter users from accessing Wi-Fi networks. It is with respect to these and other considerations that the present improvements have been needed.

DETAILED DESCRIPTION

Embodiments provide novel networking mechanisms that facilitate a fast and efficient process for identifying which Wi-Fi networks a wireless device is permitted to access with the user or device credentials. The embodiments generally reduce or remove manual operations currently needed for determining which, if any, wireless networks a user can access. The embodiments enable a wireless device to automatically identify available wireless networks including those of a home service provider and visiting networks. As a result, the embodiments enhance user experience, aid in device power saving while providing automatic Wi-Fi network connection capability, and provide seamless session continuity and offloading between different wireless networks. Other advantages exist as well.

Various embodiments may comprise one or more elements. An element may comprise any structure arranged to perform certain operations. Some elements may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

In various embodiments, radio communication is facilitated using a wireless local area network (WLAN)-based technology, such as IEEE 802.11 based networks, for example. In particular, the present embodiments address issues identified to update and improve one or more Hotspot standards designed to interoperate with various types of WLANs, such as an IEEE 802.11 based networks. Embodiments may be implemented, for example, as part of Wi-Fi Alliance® Technical Committee Hotspot 2.0 Technical Task Group Hotspot 2.0 (Release 2) Technical Specification, Version 2.04, dated Jan. 2, 2013 ("Hotspot 2.0"), along with its variants, modifications and progeny. It may be appreciated, however, that the embodiments are not limited to IEEE 802.11 standards or Hotspot 2.0 standards, and may be used with any suitable wireless networks as desired for a given implementation. The embodiments are not limited in this context.

Figure 1:
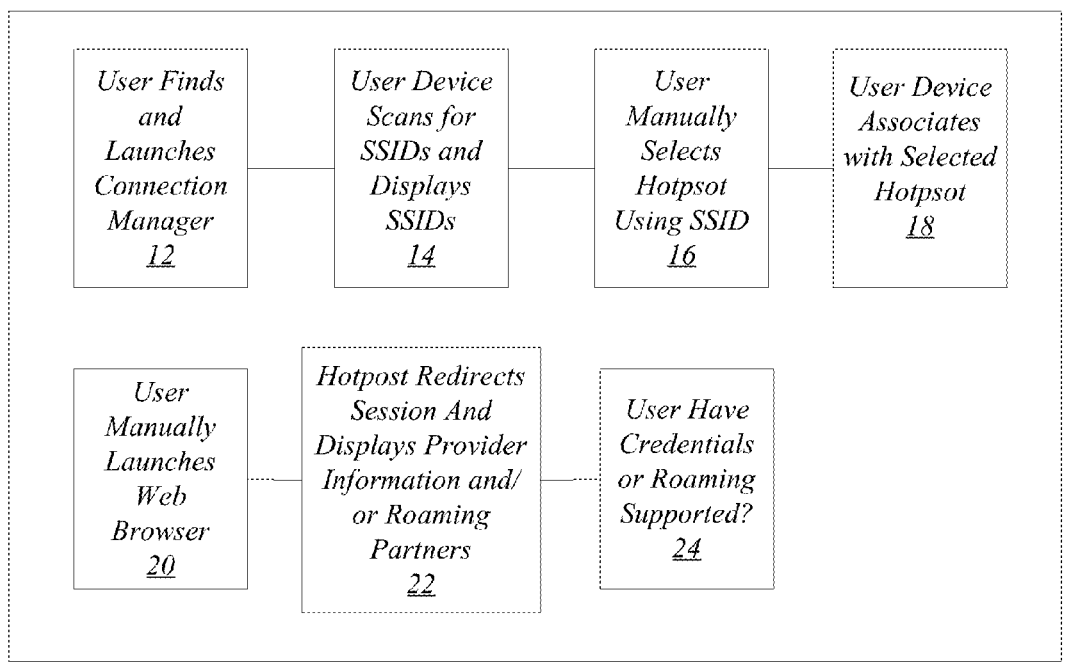
FIG. 1 depicts processes for network authentication.

Current mechanisms for linking a wireless device to a public wireless access network rely on static configuration of SSID information on the devices. One example of a conventional process flow involved for access to a Wi-Fi public hotspot is shown in FIG. 1. At block 12, a user finds and launches a connection manager or similar program provided by the user's wireless device. At block 14, the user's wireless device performs a scan to determine wireless networks, if any, that are within communications range of the user and presents SSIDs of wireless networks found to the user on an interface in the user's wireless device. At block 16, the user manually selects a wireless network hotspot from one of the SSIDs presented by the wireless network. At block 18 the user's device associates with the selected wireless network hotspot. At block 20, the user then manually launches a web browser program on the user's wireless device. At block 22, the session is redirected by communications from the hotspot such that the user's device displays provider and/or roaming partner information related to the hotspot selected. At block 24, a determination is made as to whether the user has credentials for using the wireless network of the service provider of the hotspot or whether network roaming is supported.

To improve upon the above process outlined in FIG. 1, the present embodiments provide mechanisms to automatically identify a list of access points that can provide wireless service to a device for a given set of security credentials, and select an access point from the identified list of access points for connection.

In particular embodiments, a Network Access Identifier (NAI)-based query mechanism is employed for identifying Wi-Fi hotspots that can provide access to network for the given set of credentials for a user, device and/or system. In conventional implementation, a Network Access Identifier (NAI) constitutes a user identity that is submitted by the client (user device) during network access authentication. In roaming scenarios, the purpose of the NAI is to identify the user as well as to assist in the routing of an authentication request.

In various embodiments a new protocol is introduced to update the Hotspot 2.0 specification, and in particular to the "Access Network Query Protocol (ANQP)." The present embodiments employ ANQP to simplify home service provider (SP) roaming partner identification by adding a "NAI home realm" query to a network access process. A NAI home realm may comprise, for example, a domain associated with any home service provider of a user's wireless device. For example, a first NAI may read "username@ homeISP1.com," where "homeISP1.com is a home realm for the user's wireless device. In one set of implementations, and as detailed below the user's wireless device queries the network associated with a hotspot with a message that is the equivalent of "Do you provide access for the users of MyHomeSP?" and the network provides a YES or NO response. In this manner, the user device may query any hotspots (access points) within communications range and automatically identify a set of access points that provide service to the user device based upon identifier information about the user's home service providers sent in the NAI home realm query. The user device may then select from the set of identified access points an access point with which communications are to be established.

Figure 2:
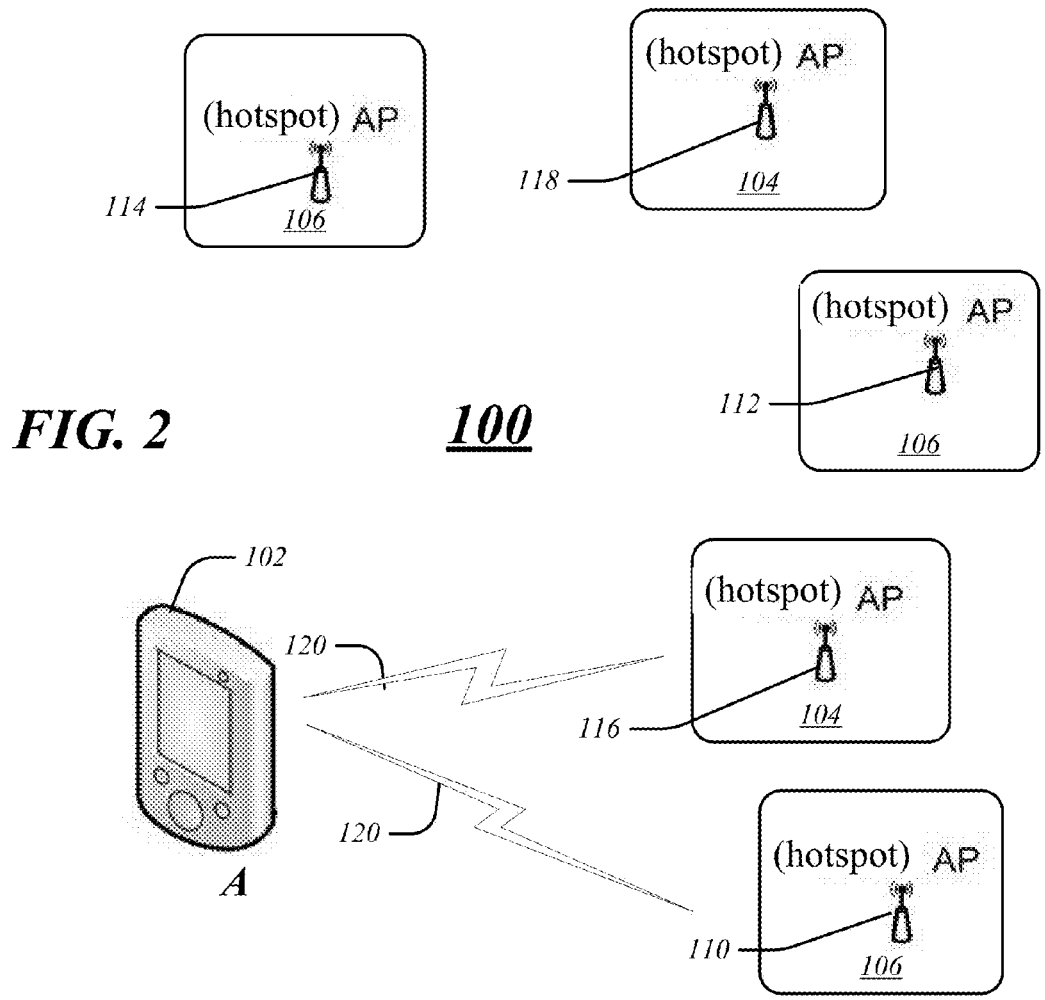
FIG. 2 depicts one scenario for network authentication consistent with the present embodiments.

FIG. 2. illustrates a use scenario consistent with the present embodiments that involves a communications arrangement 100. The communications arrangement 100 includes a network 104 and network 106. Within each network 104 and network 106 multiple wireless communications points are deployed such as the access points (AP) shown in FIG. 2. Unless otherwise noted, as used herein, the term "access point" and "hotspot" are used interchangeably to refer to a wireless base station that forms part of a network. Also illustrated in FIG. 2 is a wireless device 102, which may be a mobile device such as a laptop computer, tablet computing device, smart phone or other electronic computing device or communications device, a television (TV), or videogame device. The embodiments are not limited in this context.

As the wireless device 102 moves between locations, wireless communications may be established and/or broken between the wireless device 102 and one or more communications points within the WLAN 104 and WLAN 106. In conventional operation, the wireless device 102 may be set to scan for available networks to establish a communications link. This scanning may take place according to a predetermined procedure, whether the wireless device 102 is stationary or moving between locations. Under conventional operation, the wireless device 102 may attempt to associate with one or more access points 110-118 as the wireless device 102 enters to within communications range of a respective access point. However, in conventional operation, before the wireless device 102 becomes associated with any of the given wireless access points 110-118, the various operations outlined in FIG. 1 are performed, requiring excessive and burdensome user intervention for the user of wireless device 102, as discussed above.

However, in the present embodiments, mechanisms are provided that facilitate network discovery and selection for the wireless device 102 via an access point such as access points 110-118 without excessive user intervention, provided the wireless device 102 exhibits the appropriate credentials as detailed below. In various embodiments, network selection may be initiated with the aid of a generic advertisement service (GAS) mechanism, which provides for discovery of suitable networks (pre-association) through the advertisement of access network type (private network, free public network, for-fee public network), roaming consortium, and venue information. For example, the wireless device 102 may send an ANQP element identifying home service providers of user device 102 that is contained within a GAS message, such as a GAS initial request frame. This GAS initial request frame may be relayed by one or more of the access points 110-118 to a respective server for the network associated with the access point. In addition, the access point may deliver the server's response back to the wireless device 102.

In the example of FIG. 2, when the wireless device 102 is located at position A the wireless device 102 may send a message such as a GAS message 120, which is received by two access points in close proximity to the wireless device 102, such as access points 110, 116. In one exemplary implementation, the access point 116 may be part of a network 104 of a first service provider, while the access point 110 is part of the network 106 of a second service provider. Consistent with the present embodiments, and detailed below with respect to FIG. 4, in one specific scenario the first service provider of network 104 may determine from the GAS message 120 that the home service provider of (the user of) wireless device 102 is to be permitted network access via the AP (hotspot) 116, while the second service provider of network 106 may determine from the GAS message 120 that the home service provider of (the user of) wireless device 102 is not to be permitted network access via the AP (hotspot) 110. Accordingly, the wireless device 102 may receive response messages from each of AP 116, 110, which apprises the wireless device 102 that association may (only) take place via AP 116. The wireless device 102 may consequently perform the appropriate tasks to determine association depending on a set protocol; for example, the wireless device 102 may then continue to complete an association process so that linking to the network 104 is completed.

Figure 3:
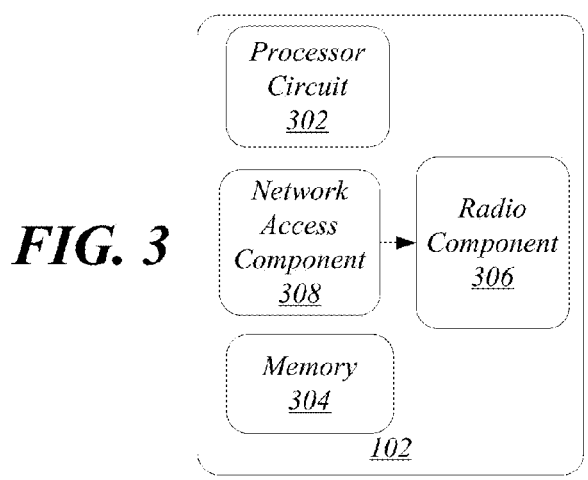
FIG. 3 depicts an embodiment of an apparatus.

FIG. 3. depicts an embodiment of the wireless device 102 consistent with the present embodiments. The wireless device 102 includes a processor circuit 302, memory 304, radio component 306, and network access component 308. The network access component 308 may facilitate network discovery and association as detailed below. In brief, the memory 304 may store one or more identifiers that identify a respective one or more home service providers for the wireless device 102. The network access component 308 may schedule for wireless transmission a user identifier message that includes a list of the one or more identifiers, and may receive in return one or more response messages that indicate whether network access is permitted via a responding access point or hotspot. For example an access point (hotspot) may respond that network access is permitted and may include a supported provider list that identifies one or more providers that provide access via the hotspot. Such supported provider lists may be sent wirelessly from one or more access points that receive the user identifier message. The network access component 308 may then select a provider from a supported provider list of the one or more supported provider lists, where the selected provider corresponding to an identifier of the one or more identifiers that was sent by the wireless device 102. The network access component 308 may then schedule association with an access point that provides the selected provider.

The network access component 308 and radio component 306 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 4:
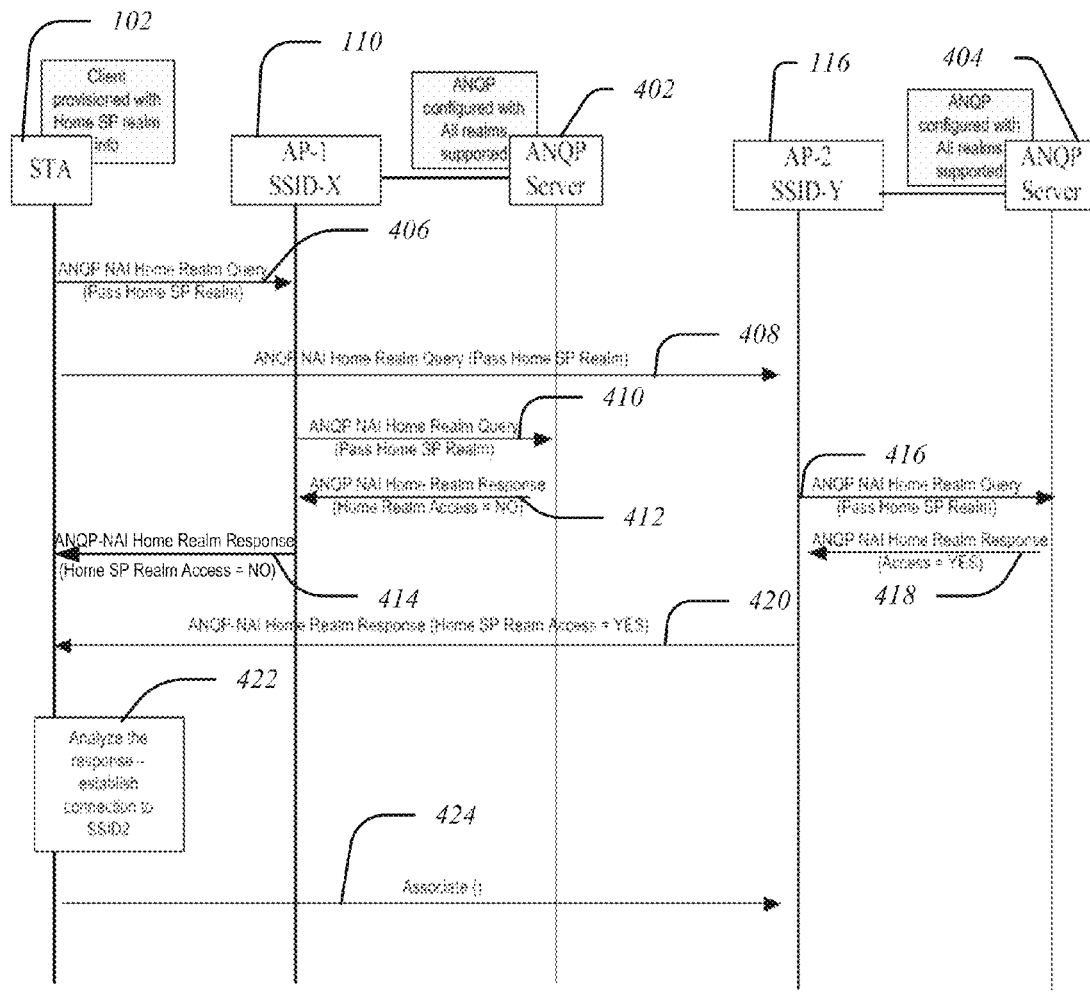
FIG. 4 depicts an exemplary set of message flows.

FIG. 4 illustrates one embodiment of message flow for accessing a hotspot that may be performed by the wireless device 102 in conjunction with one or more networks. In particular, FIG. 4 illustrates an exemplary wireless communications architecture for a user's wireless device (STA) 102 in one scenario in which multiple access points (or hot spots) may be available within wireless communications range to the STA 202. In the example illustrated, the access point AP-1 may constitute the access point 110 of FIG. 2. The AP 110 includes a first SSID labeled SSID-X for the purposes of illustration. The AP 110 is coupled to a first ANQP server 402 which may belong to the network 104 of a first network provider. A second access point labeled AP-2, which may constitute the access point 116 of FIG. 2, includes a second SSID labeled SSID-Y for the purposes of illustration. The AP 116 is coupled to a second ANQP server 404 which may belong to the network 106 of a second network provider.

Figure 5:
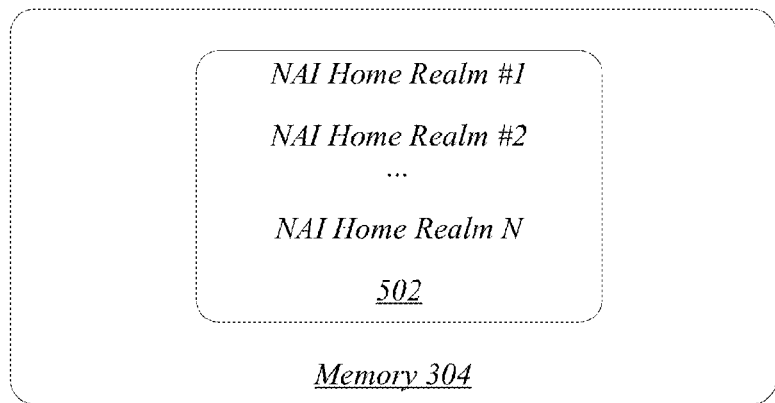
FIG. 5 depicts an exemplary data structure in a wireless device.

In the scenario shown in FIG. 4, the wireless device 102, which may represent any type of client device (e.g., smart phone, tablet computer, notebook computer, etc.), is provisioned with credential(s) from one or more home server provider(s). FIG. 5 illustrates a home realm list 502 that may be stored in the memory 304 in which home service provider information is stored for use in authentication. The home service provider information may include the name(s) of home service provider realms for networks from which the user device 102 has received credentials to access the given network.

In the architecture of FIG. 4, ANQP servers such as ANQP servers 402, 404 are configured with network information including all the realms in which the given server provides network access, including those of the respective networks 104, 106.

The home service provider information in home realm list 502 facilitates the ability for the wireless device 102 to decide if and whether to use a hotspot based upon information that may be received from an access point (hotspot). In various embodiments, when the wireless device 102 searches for a Wi-Fi connection that it can access using its credential(s) from the home SP, the wireless device 102 sends a set of ANQP NAI Home Realm queries containing the realm(s) of its home SP(s). In the example of FIG. 5, these queries indicate that the wireless device 102 has credentials for home realms that include NAI home realm #1, NAI home realm #2, . . . NAI home realm #N. These queries may then be used for searching if any access point within communications range is connected to a network that allows access to the home SP customers of the NAI home realms sent in the NAI home realm queries. In typical scenarios, a potential access network provider, e.g., networks 104, 106, could be either a home SP network or a network of a roaming partner of a home SP.

Referring to both FIG. 2 and FIG. 4, when the wireless device 102 enters the area A, the wireless device 102 may detect, among others, the access point 110 and the access point 116. Accordingly, the wireless device 102 generates a set of ANQP NAI home realm queries to determine network availability. As shown in FIG. 4, the wireless device 102 sends an ANQP network access identifier home realm query 406 to the access point having the SSID-X, which is AP 110 in this example. As further shown in FIG. 4, the wireless device 102 also sends an ANQP network access identifier home realm query 408 to the access point having the SSID-Y, that is, AP 116 in this example.

Upon receipt of each respective ANQP NAI home realm query message, the respective receiving AP may forward the respective ANQP NAI home realm query message to an ANQP server as shown in FIG. 4. As a first example, the ANQP network access identifier home realm query 406 is forwarded by the access point 110 to ANQP server 402 as an ANQP network access identifier home realm query 410. The ANQP server 402 then examines the ANQP network access identifier home realm query 410 to determine the realms listed therein. In the scenario of FIG. 4, the ANQP server 402 examines a list of realms that are provided in the ANQP NAI home realm query 410, that is, the home realm list 502, which realms correspond to service providers for the wireless device 102 that provide credentials to access services.

Figure 6:
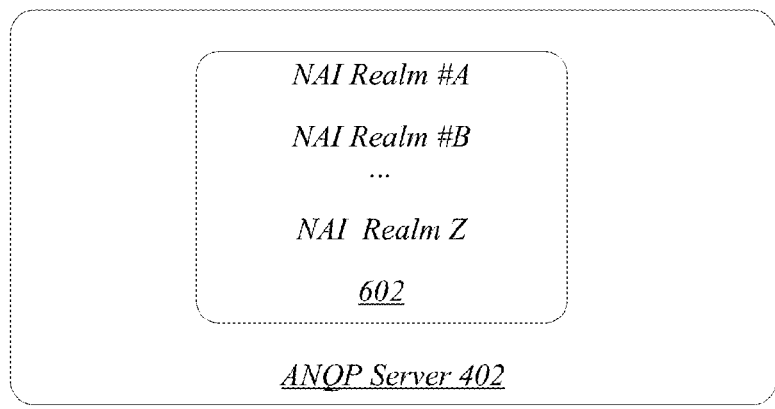
FIG. 6 depicts a data structure in a network server.

The ANQP server 402 may then check its own memory to examine a realm list that contains a listing of realms for which the ANQP server 402 provides network access. FIG. 6 provides an example of a realm list 602 that may be contained by the ANQP server 402. As shown, the realm list 602 includes NAI realm #A, NAI realm #B, NAI realm #Z, which represent different realms that are supported by the ANQP server 402. In comparing the realm list 602 to the home realm list 502 sent by the wireless device 102 in the ANQP NAI home realm query 410, the ANQP 402 server may determine that there are no matches between lists. In other words, none of the realms supported by the ANQP server 402 (NAI home realm #A, NAI home realm #B, NAI home realm #Z) correspond to realms listed in the ANQP NAI home realm query 410. After making this determination, the ANQP server 402 returns an ANQP NAI home realm response 412 to the access point 110, which indicates that the ANQP server 402 does not support network access for the wireless device 102 based upon the ANQP NAI home realm query 410. Accordingly, the ANQP NAI home realm response 412 indicates "home realm access=NO" as shown in FIG. 4. The access point 110 forwards this response as an ANQP NAI home realm response 414 to wireless device 102, which indicates to the wireless device 102 "home realm access=NO" as shown in FIG. 4. This informs the wireless device 102 that the ANQP server 402 does not support network access for the wireless device 102 based upon the ANQP NAI home realm query 410.

In a further example, the ANQP network access identifier home realm query 408 is forwarded by the access point 116 to ANQP server 404 as the ANQP network access identifier home realm query 416. The ANQP server 402 then examines the ANQP network access identifier home realm query 416 to determine the realms listed therein. In the scenario of FIG. 4, the ANQP server 404 examines a list of realms that are provided in the ANQP NAI home realm query 416, that is, the home realm list 502, which realms correspond to service providers for the wireless device 102 that provide credentials to access services.

Figure 7:
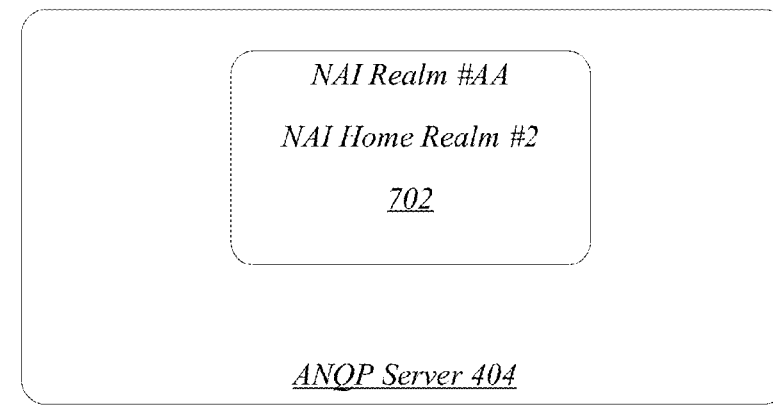
FIG. 7 depicts a further data structure in another network server.

The ANQP server 404 may then check its own memory to examine a realm list that contains a listing of realms for which the ANQP server 404 provides network access. FIG. 7 provides an example of a realm list 702 that may be contained by the ANQP server 404. As shown, the realm list 702 includes NAI home realm #AA and NAI home realm #2, which represent different realms that are supported by the ANQP server 404. In comparing the realm list 702 to the home realm list 502 sent by the wireless device 102 in the ANQP NAI home realm query 416, the ANQP 404 server may determine that there is a match between lists. In other words, the home realm list 502 includes an entry NAI home realm #2, which matches a similar entry in realm list 702. The home realm #2 may correspond to network 106 or another network supported by the ANQP server in different instances. After making this determination, the ANQP server 404 returns an ANQP NAI home realm response 418 to the access point 116, which indicates that the ANQP server 404 does support network access for the wireless device 102 based upon the ANQP NAI home realm query 410. Accordingly, the ANQP NAI home realm response 418 indicates "home realm access=YES" as also shown in FIG. 4.

The access point 116 forwards this response as an ANQP NAI home realm response 420 to wireless device 102, which indicates to the wireless device 102 "home realm access=YES" as shown in FIG. 4. This informs the wireless device 102 that the ANQP server 402 does support network access for the wireless device 102 based upon the ANQP NAI home realm query 416. The ANQP NAI home realm response 420 may additionally provide a supported provider list that identifies the supported provider, that is, NAI home realm #2.

After receiving the ANQP NAI home realm response 414 and ANQP NAI home realm response 420, the wireless device 102, and in particular, the network access component 308, may perform an analysis 422 to determine that the access point 116, identified by the SSID-Y, does provide network access, while the access point 110 does not provide network access. The wireless device 102 may further determine that no other hotspots (AP) within communications range currently provide network access. Accordingly, the wireless device 102 may send an association message 424 to the access point 116 to link to the network denoted by home realm #2. Subsequently, network access is automatically provided to wireless device 102 via access point 116 without requiring user intervention.

The present embodiments as outlined in FIG. 4 thus provide an updating for the ANQP protocol established for IEEE 802.11 communications. In one embodiment, for example, IEEE 802.11u defines Generic Advertisement Service (GAS) and Access Network Query Protocol (ANQP) by which pre-associated frames can be exchanged using query and response mechanism which allows discovery of access network information. The WFA Hotspot 2.0 specification extends the IEEE 802.11u ANQP messages and in particular, by use of the "NAI Home Realm Query" process that has been included in the Hotspot 2.0 ANQP queries. As noted, in one implementation of the present embodiments, "NAI Home Realm Query" normative text and structures have been submitted and adopted for inclusion in section 4.6 of the Hotspot 2.0 release 2 specification, which is excerpted below.

In particular, section 4.6 provides examples of the content of an ANQP home realm query including the data structure that contains identifiers of home service providers of a requesting wireless device.

4.6 NAI Home Realm Query

The NAI Home Realm Query element is used by a requesting mobile device to determine if the network access identifier (NAI) realms for which it has security credentials are realms corresponding to SPs or other entities whose networks or services are accessible via this BSS. The requesting mobile device includes in an NAI Home Realm Query only the NAI Home Realm Name(s) for which it has credentials.

In response to the NAI Home Realm Query, a responding AP returns a NAI Realm List formatted as specified in section 8.4.4.10. The NAI Realm List includes only realms exactly matching realms contained in the NAI Home Realm Query. The NAI Realm List can contain one or more NAI Realm Data fields (see FIG. 8-417) having one or more matching realms contained within the NAI Realm Data field (see FIG. 8-418). If the responding AP has no matching NAI Realm subfields, then the NAI Realm List is returned with the NAI Realm Count set to zero.

Note: a mobile device can include the NAI Home Realm Query as the sole ANQP element in a GAS Initial Request frame.

The format of the NAI Home Realm Query Payload is provided in FIG. 13 (Table I).

TABLE I

NAI Home Realm Query element payload

| NAI-Home Realm Count | NAI Home Realm Name Data #1 | NAI-Home Realm Name Data #2 (optional) | NAI-Home Realm Name Data #n (optional) |
|---|---|---|---|
| Octets: 1 | variable | variable | variable |

The NAI Home Realm Count is a 1-octet field that specifies the number of NAI Home Realm Name Data fields included in the NAI Home Realm Query. The format of the NAI Home Realm Name Data is shown in FIG. 14 (Table II).

TABLE II

NAI Home Realm Name Data format

| NAI Realm Encoding | NAI Home Realm Name Length | NAI Home Realm Name |
|---|---|---|
| Octets: 1 | 1 | Variable |

Figure 8:
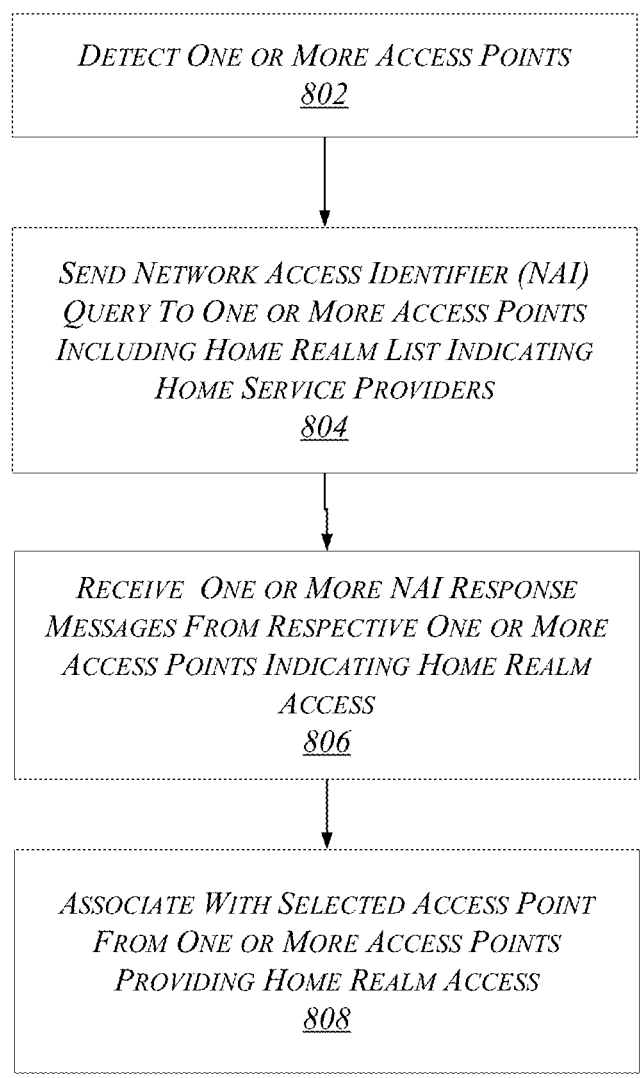
FIG. 8 depicts an exemplary first logic flow.

The NAI Realm Encoding is a 1-octet sub-field whose format is defined in FIG. 8-419 and described in section 8.4.4.10.

NAI Home Realm Name Length sub-field is a 1-octet sub-field whose value is the length of the NAI Realm Name sub-field.

The NAI Home Realm Name sub-field is one or more NAI Home Realms formatted as defined in the NAI Realm subfield of the NAI Realm Data field as described in section 8.4.4.10. The maximum length of this sub-field is 255 octets.

It is to be noted that in some scenarios of the present embodiments, in response to an ANQP home realm query multiple realms may be identified by responding access points that permit access to a user device, such as wireless device 102. For example, a first access point may return a first ANQP home realm response that identifies two different realms, while a second access point returns a second ANQP home realm response that identifies a third realm, each or which realms permits access to the wireless device. In such cases, the wireless device 102, and in particular access component 308, may perform selection of a realm based upon policy that is preestablished for the wireless device, such as by a home service provider of the wireless device.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 8 depicts an exemplary first logic flow 800. The logic flow 800 may be implemented, for example, by a network access component 308 of wireless device. At block 802, one or more access points are detected. At block 804, a network access identifier query that includes a home realm list indicating home service providers for a wireless device is sent to one or more access points. At block 806, one or more NAI response messages is received from a respective one or more access points, where a response message indicates whether home realm access is provided by that access point. At the block 808, association is performed with a selected access point from the one or more access points that provides home realm access.

Figure 9:
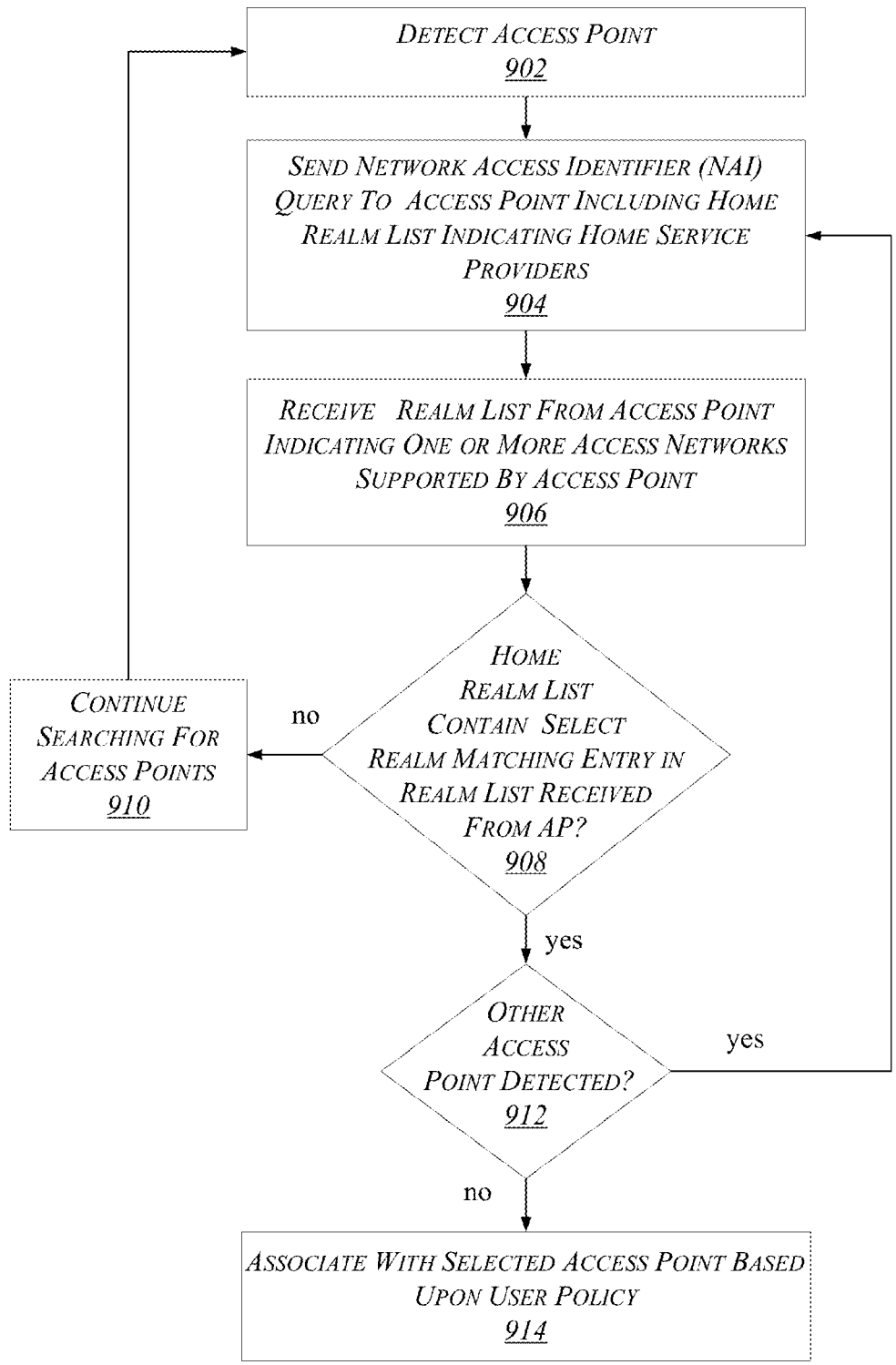
FIG. 9 shows an exemplary second logic flow.

FIG. 9 depicts an exemplary second logic flow 900. At block 902, an access point is detected. At block 904, a network access identifier query is sent to the detected access point including a home realm list that indicates home service providers for a wireless device. At block 906, a realm list is received from the detected access point which identifies one or more supported providers, that is, access networks supported by the access point.

At decision block 908 a determination is made as to whether the home realm list sent contains a select realm or realms that matches an entry or entries in the realm list received from the detected access point. If not, the flow proceeds to block 910 where searching for access points is continued. After block 910, the flow returns to block 902.

If, at decision block 908 a match or matches is determined, the flow proceeds to block 912. At decision block 912, a determination is made as to whether additional access points have been detected. If so, the flow proceeds to block 904 where a network access identifier query is sent to the additional detected access point including a home realm list that indicates home service providers for a wireless device. If not, the flow proceeds to block 914 where association is performed with a selected access point based upon user policy.

In summary, the present embodiments provide the following benefits for accessing wireless networks. To begin with, the techniques of the present embodiments employ only simple an ANQP NAI Home Realm query/response message exchange that can be performed very rapidly. This also simplifies NAI Home Realm roaming identification significantly. In addition, the techniques of the present embodiments remove the dependency on existing SSID-based network discovery and selection which existing procedures are static, only allow home SP home network identification, are not easily scalable well for large scale scenarios, and do not provide any information about a roaming partners of a home SP. Another advantage afforded by the present embodiments is that hard coding of SSID on a device is not required. The present embodiments also provide for the wireless device to identify both home SP network and also roaming partners' networks. A further advantage is that wireless devices can quickly and reliably discover a network the wireless device can have access to, which may help power saving by minimizing the discovery time. This also reduces overhead by transmitting minimal and only essential information over the air. Finally, the present embodiments facilitate automatic wireless network discovery and selection, thereby eliminating the need for a user to manually intervene during this process.

Figure 10:
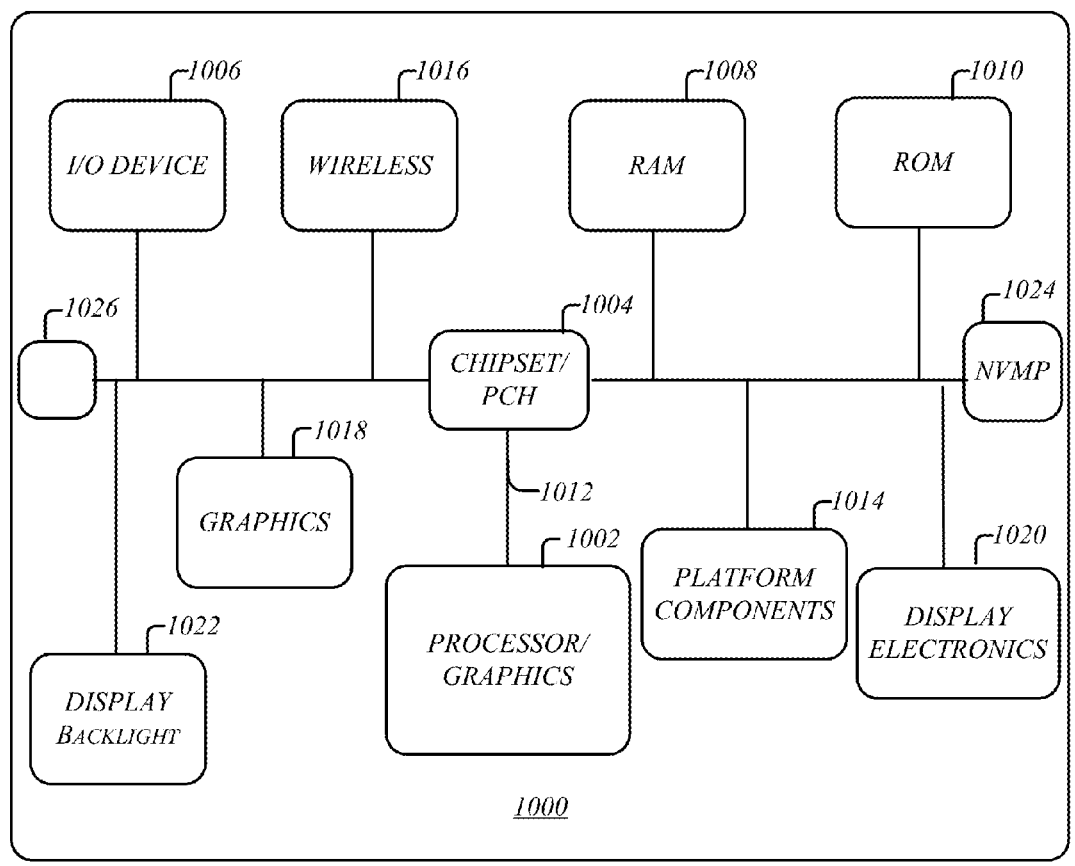
FIG. 10 illustrates an exemplary system architecture.

FIG. 10 is a diagram of an exemplary system embodiment and in particular, FIG. 10 is a diagram showing a platform 1000, which may include various elements. For instance, FIG. 10 shows that platform (system) 1000 may include a processor/graphics core 1002, a chipset/platform control hub (PCH) 1004, an input/output (I/O) device 1006, a random access memory (RAM) (such as dynamic RAM (DRAM)) 1008, and a read only memory (ROM) 1010, display electronics 1020, display backlight 1022, non-volatile memory port 1024, antenna 1026, and various other platform components 1014 (e.g., a fan, a crossflow blower, a heat sink, DTM system, cooling system, housing, vents, and so forth). System 1000 may also include wireless communications chip 1016 and graphics device 1018. The embodiments, however, are not limited to these elements.

As shown in FIG. 10, I/O device 1006, RAM 1008, and ROM 1010 are coupled to processor 1002 by way of chipset 1004. Chipset 1004 may be coupled to processor 1002 by a bus 1012. Accordingly, bus 1012 may include multiple lines.

Processor 1002 may be a central processing unit comprising one or more processor cores and may include any number of processors having any number of processor cores. The processor 1002 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 1002 may be multiple separate processors located on separate integrated circuit chips. In some embodiments processor 1002 may be a processor having integrated graphics, while in other embodiments processor 1002 may be a graphics core or cores.

The following examples pertain to further embodiments.

Example 1 is an apparatus that includes a memory to store one or more identifiers for respective one or more home service providers; circuitry coupled to the memory; and a network access component for execution on the circuitry to automatically identify a set of access points that can provide wireless service to a device based upon the one or more identifiers, and select an access point from the identified set of access points to establish a wireless connection.

In example 2, the network access component may optionally be to schedule for wireless transmission a user identifier message including a list of the one or more identifiers, the user identifier message comprising a network access identifier (NAI) message that identifies the apparatus and a list of NAI home realms for which the device has security credentials.

In example 3, the network access component of any of the examples 1-2 may optionally be to receive one or more response messages that include a respective one or more supported provider list, the one or more response messages including respective one or more realm lists, each of the one or more realm lists including only a list of realms that each provides a match to a corresponding realm in the list of NAI home realms of the NAI message.

In example 4, the network access component of any of the examples 1-3 may optionally be to select a provider from a supported provider list of the one or more supported provider lists, the selected provider corresponding to an identifier of the one or more identifiers, the one or more response messages including respective one or more NAI realm lists, each NAI realm list identifying one or more service providers whose networks or services are accessible via a respective wireless access point.

In example 5, the network access component of any of the examples 1-4 may optionally be for execution on the circuitry to: specify in a first field a number corresponding to the list of NAI home realms for which the apparatus has security credentials; and specify in a second field an NAI home realm name for each NAI home realm for which the user device has security credentials.

In example 6, the network access component of any of the examples 1-5 may optionally be to schedule association with an access point that provides the selected provider.

In example 7, the network access component of any of the examples 1-6 may optionally be to read a network access identifier (NAI) realm list in the response message in order to schedule association with the access point.

In example 8, the network access component of any of the examples 1-7 may optionally be to select a NAI realm from among the one or more NAI realm lists in order to schedule association with the access point.

In example 9, the network access component of any of the examples 1-8 may optionally be to forward the NAI realm in an association message in order to schedule association with the access point.

In example 10, the network access component of any of the examples 1-9 may optionally be for execution on the circuitry to read the one or more NAI realm lists, determine if there are no matches between the one or more NAI realm lists and list of home NAI realms, and schedule for wireless transmission an additional user identifier message if there are no matches between the one or more NAI realm lists and list of home NAI realms.

In example 11, the network access component of any of the examples 1-10 may optionally be for execution on the circuitry to provide a network access identifier (NAI) home realm query as a sole element in a generic advertisement service (GAS) initial request frame.

In example 12, the network access component of any of the examples 1-11 may optionally be for execution on the circuitry to select a service provider based upon operator policy of the apparatus if the one or more supported provider lists include in total two or more providers that each match a respective home service provider of the apparatus.

In example 13, the apparatus of any of the examples 1-12 may optionally include an antenna to transmit and receive communications over the wireless connection.

In example 14, a computer implemented method includes sending a user identifier message including a list of identifiers for one or more home service providers for a user device over a wireless connection, receiving one or more response messages that include a respective one or more provider lists, selecting a provider from a supported provider list of the one or more provider lists that matches an identifier of the list of identifiers, and associating with an access point that supports the selected provider.

In example 15, the user identifier message of example 14 may optionally include a network access identifier (NAI) message that identifies the user device and a list of NAI home realms for which the user device has security credentials.

In example 16, the one or more response messages of any of the examples 14-15 may optionally include respective one or more realm lists, each of the one or more realm lists including only a list of realms that each provides a match to a corresponding realm in the list of NAI home realms of the NAI message.

In example 17, the one or more response messages of any of the examples 14-16 may optionally include respective one or more NAI realm lists, each NAI realm list identifying one or more service providers whose networks or services are accessible via a wireless access point.

In example 18, the computer implemented method of any of the examples 14-17 may optionally include specifying in a first field a number corresponding to the list of NAI home realms for which the user device has security credentials, and specifying in a second field an NAI home realm name for each NAI home realm for which the user device has security credentials.

In example 19, the computer implemented method of any of the examples 14-18 may optionally include reading a network access identifier (NAI) realm list in the response message; selecting an NAI realm from among the NAI realm list; and forwarding the NAI realm in an association message.

In example 20, at least one computer-readable storage medium comprises instructions that, when executed, cause a system to schedule for wireless transmission a user identifier message including a list of identifiers of one or more home service providers for a user device, to receive one or more response messages that include a respective one or more supported provider list, to select a provider from a supported provider list of the one or more supported provider lists that matches an identifier of the list of identifiers of the user device, and to schedule association with an access point that provides the selected provider.

In example 21, the user identifier message of example 20 may optionally include a network access identifier (NAI) message that identifies the user device and a list of NAI home realms for which the user device has security credentials.

In example 22, the one or more response messages of any of the examples 20-21 may optionally include a respective one or more realm list s, each of the one or more realm lists including only a list of realms that each provides a match to a corresponding realm in the list of NAI home realms of the NAI message.

In example 23, the one or more response messages of any of the examples 20-22 may optionally include respective one or more NAI realm lists, each NAI realm list identifying one or more service providers whose networks or services are accessible via a respective wireless access point.

In example 24, the at least one computer-readable storage medium of any of the examples 20-23 may optionally include instructions that, when executed, cause a system to specify in a first field a number corresponding to the list of NAI home realms for which the user device has security credentials, and specify in a second field an NAI home realm name for each NAI home realm for which the user device has security credentials.

In example 25, the at least one computer-readable storage medium of any of the examples 20-24 may optionally include instructions that, when executed, cause a system to read a network access identifier (NAI) realm list in the response message, select an NAI realm from among the NAI realm list, and forward the NAI realm in an association message.

In example 26, the at least one computer-readable storage medium of any of the examples 20-25 may optionally include instructions that, when executed, cause a system to: read the one or more NAI realm lists, to determine if there are no matches between the one or more NAI realm lists and list of home NAI realms, and to schedule for wireless transmission an additional user identifier message if there are no matches between the one or more NAI realm lists and list of home NAI realms.

In example 27, the at least one computer-readable storage medium of any of the examples 20-26 may optionally include instructions that, when executed, cause a system to provide a network access identifier (NAI) home realm query as a sole element in a generic advertisement service (GAS) initial request frame.

In example 28, an apparatus includes a radio component, a memory to store one or more identifiers for respective one or more home service providers, circuitry coupled to the memory, and a network access component for execution on the circuitry to automatically identify a set of access points that can provide wireless service to a device based upon the one or more identifiers, and select an access point from the identified set of access points to establish a wireless connection.

In example 29, the network access component of example 28 may optionally be to schedule for wireless transmission a user identifier message including a list of the one or more identifiers, the user identifier message comprising a network access identifier (NAI) message that identifies the apparatus and a list of NAI home realms for which the device has security credentials.

In example 30, the network access component of any of examples 28-29 may optionally be to receive one or more response messages that include a respective one or more supported provider list, the one or more response messages including respective one or more realm lists, each of the one or more realm lists including only a list of realms that each provides a match to a corresponding realm in the list of NAI home realms of the NAI message.

In example 31, the network access component of any of examples 28-30 may optionally be to select a provider from a supported provider list of the one or more supported provider lists, the selected provider corresponding to an identifier of the one or more identifiers, the one or more response messages including respective one or more NAI realm lists, each NAI realm list identifying one or more service providers whose networks or services are accessible via a respective wireless access point.

In example 32, the network access component of any of examples 28-31 may optionally be for execution on the circuitry to specify in a first field a number corresponding to the list of NAI home realms for which the apparatus has security credentials, and specify in a second field an NAI home realm name for each NAI home realm for which the user device has security credentials.

In example 33, the network access component of any of examples 28-32 may optionally be to schedule association with an access point that provides the selected provider.

In example 34, the network access component of any of examples 28-33 may optionally be to read a network access identifier (NAI) realm list in the response message in order to schedule association with the access point.

In example 35, the network access component of any of examples 28-34 may optionally be to select a NAI realm from among the NAI realm list in order to schedule association with the access point.

In example 36, the network access component of any of examples 28-35 may optionally be to forward the NAI realm in an association message in order to schedule association with the access point.

In example 37, the network access component of any of examples 28-36 may optionally be for execution on the circuitry to: read the one or more NAI realm lists, to determine if there are no matches between the one or more NAI realm lists and list of home NAI realms, and to schedule for wireless transmission an additional user identifier message if there are no matches between the one or more NAI realm lists and list of home NAI realms.

In example 38, the network access component of any of examples 28-37 may optionally be for execution on the circuitry to provide a network access identifier (NAI) home realm query as a sole element in a generic advertisement service (GAS) initial request frame.

In example 39, the network access component of any of examples 28-38 may optionally be for execution on the circuitry to select a service provider based upon operator policy of the apparatus if the one or more supported provider lists include in total two or more providers that each match a respective home service provider of the apparatus.

The embodiments, as previously described, may be implemented using various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

In some embodiments, an element is defined as a specific structure performing one or more operations. It may be appreciated, however, that any element defined as a specific structure performing a specific function may be expressed as a means or step for performing the specified function without the recital of structure, material, or acts in support thereof, and such means or step is meant to cover the corresponding structure, material, or acts described in the detailed description and equivalents thereof. The embodiments are not limited in this context.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
a memory to store one or more identifiers associated with network access identifier (NAI) home realms for respective one or more home service providers;
circuitry coupled to the memory; and
a network access component for execution on the circuitry to:
communicate an NAI home realm query comprising a device identifier identifying a device and a list of NAI home realms for which the device has security credentials, the NAI home realm query to specify a number of NAI home realms for which the device has security credentials and a NAI home realm name for each NAI home realm,
automatically identify a set of access points that can provide wireless service to the device based upon on a received response to the NAI home realm query, and
select an access point from the identified set of access points to establish a wireless connection.

2. The apparatus of claim 1, the network access component to receive one or more response messages that include respective one or more supported provider lists, the one or more response messages including respective one or more realm lists, each of the one or more realm lists including only a list of realms that each provides a match to a corresponding realm in the list of NAI home realms of the NAI home realm query.

3. The apparatus of claim 2, the network access component to select a provider from a supported provider list of the one or more supported provider lists, the selected provider corresponding to an identifier of the one or more identifiers, the one or more response messages including respective one or more NAI realm lists, each NAI realm list identifying one or more service providers whose networks or services are accessible via a respective wireless access point.

4. The apparatus of claim 1,
the NAI home realm query comprising a first field comprising the number of NAI home realms for which the apparatus has security credentials, and one or more additional fields each comprising the NAI home realm name for each NAI home realm.

5. The apparatus of claim 3, comprising:
the network access component to schedule association with an access point that provides the selected provider.

6. The apparatus of claim 5, the network access component to read a NAI realm list in the response message in order to schedule association with the access point.

7. The apparatus of claim 6, the network access component to select a NAI realm from among the one or more NAI realm lists in order to schedule association with the access point.

8. The apparatus of claim 7, the network access component to forward the NAI realm in an association message in order to schedule association with the access point.

9. The apparatus of claim 5, comprising:
the network access component for execution on the circuitry to:
read the one or more NAI realm lists;
determine if there are no matches between the one or more NAI realm lists and list of home NAI realms; and schedule for wireless transmission an additional user identifier message if there are no matches between the one or more NAI realm lists and list of home NAI realms.

10. The apparatus of claim 1, the network access component for execution on the circuitry to provide the NAI home realm query as a sole element in a generic advertisement service (GAS) initial request frame.

11. The apparatus of claim 2, the network access component for execution on the circuitry to select a service provider based upon operator policy of the apparatus if the one or more supported provider lists include in total two or more providers that each match a respective home service provider of the apparatus.

12. The apparatus of claim 1, comprising an antenna to transmit and receive communications over the wireless connection.

13. A computer implemented method, comprising:
sending a network access identifier (NAI) home realm query comprising a device identifier identifying a device and a list of NAI home realms for each the device has security credentials, the NAI home realm query to specify a number of NAI home realms for which the device has security credentials and a NAI home realm name for each NAI home realm;
receiving one or more response messages that include a respective one or more provider lists;
selecting a provider from a supported provider list of the one or more provider lists that matches an identifier of a list of identifiers associated with the NAI home realms for which the device has security credentials; and
associating with an access point that supports the selected provider.

14. The computer implemented method of claim 13, the one or more response messages including respective one or more realm lists, each of the one or more realm lists including only a list of realms that each provides a match to a corresponding realm in the list of NAI home realms of the NAI home realm query.

15. The computer implemented method of claim 13, the one or more response messages including respective one or more NAI realm lists, each NAI realm list identifying one or more service providers whose networks or services are accessible via a wireless access point.

16. The computer implemented method of claim 13, the NAI home realm query comprising a first field comprising the number of NAI home realms for which the device has security credentials, and one or more additional fields each comprising the NAI home realm name for each NAI home realm.

17. The computer implemented method of claim 13, comprising:
reading a NAI realm list in the response message;
selecting an NAI realm from among the NAI realm list; and
forwarding the NAI realm in an association message.

18. At least one non-transitory computer-readable storage medium comprising instructions that, when executed, cause a system to:
communicate an NAI home realm query comprising a device identifier identifying a device and a list of NAI home realms for which the device has security credentials, the NAI home realm query to specify a number of NAI home realms for which the device has security credentials and a NAI home realm name for each NAI home realm;
receive one or more response messages that include a respective one or more supported provider list;
select a provider from a supported provider list of the one or more supported provider lists that matches an identifier of list of identifiers of a user device associated with the NAI home realms; and
schedule association with an access point that provides the selected provider.

19. The at least one non-transitory computer-readable storage medium of claim 18, the one or more response messages including respective one or more realm lists, each of the one or more realm lists including only a list of realms that each provides a match to a corresponding realm in the list of NAI home realms of the NAI home real query.

20. The at least one non-transitory computer-readable storage medium of claim 19, the one or more response messages including respective one or more NAI realm lists, each NAI realm list identifying one or more service providers whose networks or services are accessible via a respective wireless access point.

21. The at least one non-transitory computer-readable storage medium of claim 18, the NAI home realm query comprising a first field comprising the number of NAI home realms for which the device has security credentials, and one or more additional fields each comprising the NAI home realm name for each NAI home realm.

22. The at least one non-transitory computer-readable storage medium of claim 18, comprising instructions that, when executed, cause a system to:
read a NAI realm list in the response message;
select an NAI realm from among the NAI realm list; and
forward the NAI realm in an association message.

23. The at least one non-transitory computer-readable storage medium of claim 20, comprising instructions that, when executed, cause a system to:
read the one or more NAI realm lists;
determine if there are no matches between the one or more NAI realm lists and list of home NAI realms; and
schedule for wireless transmission an additional NAI home realm query if there are no matches between the one or more NAI realm lists and list of home NAI realms.

* * * * *